(12) United States Patent
Wietzke et al.

(10) Patent No.: US 6,395,237 B1
(45) Date of Patent: May 28, 2002

(54) CIRCULATING FLUIDIZED BED REACTOR WITH SELECTIVE CATALYTIC REDUCTION

(75) Inventors: Donald L. Wietzke, Copley; Michael L. Silvey, Massillon; Mikhail Maryamchik, Copley Township, Summit County; Michael J. Szmania, Medina, all of OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/503,218

(22) Filed: Feb. 13, 2000

(51) Int. Cl.$^7$ ............................ B01D 53/54; C01B 21/00
(52) U.S. Cl. .................. 422/171; 422/170; 422/172; 422/177; 422/147

(58) Field of Search ................... 422/145, 147, 422/170, 171, 172, 177, 173; 110/216, 245

(56) References Cited

U.S. PATENT DOCUMENTS

| | | | | |
|---|---|---|---|---|
| 4,310,498 A | * | 1/1982 | Malki et al. ................ | 423/242 |
| 5,343,830 A | * | 9/1994 | Alexander et al. .......... | 422/145 |
| 5,525,317 A | * | 6/1996 | Bhat et al. .................. | 422/172 |

* cited by examiner

*Primary Examiner*—Hien Tran
(74) *Attorney, Agent, or Firm*—Eric Marich; Kathryn W. Grant

(57) ABSTRACT

A CFB reactor or combustor having a selective catalytic reduction (SCR) system employed downstream of the CFB reactor or combustor furnace together with a dry scrubber system to achieve enhanced NO, reduction.

11 Claims, 2 Drawing Sheets

CIRCULATING FLUIDIZED BED REACTOR WITH SELECTIVE CATALYTIC REDUCTION

FIELD OF THE INVENTION

The present invention relates, in general, to circulating fluidized bed (CFB) reactors or combustors and, more particularly, to a CFB reactor or combustor having a selective catalytic reduction (SCR) system employed downstream of the CFB reactor or combustor furnace to achieve enhanced $NO_x$ reduction capability.

BACKGROUND OF THE INVENTION

Environmental protection and the control of solid, liquid and gaseous effluents or emissions are key elements in the design of steam generating systems which utilize the heat generated by the combustion of fossil fuels to generate steam. At present, the most significant of these emissions are sulfur dioxide ($SO_2$), oxides of nitrogen ($NO_x$) and airborne particulate.

$NO_x$ refers to the cumulative emissions of nitric oxide (NO), nitrogen dioxide ($NO_2$) and trace quantities of other species generated during combustion. Once the fuel is chosen, $NO_x$ emissions are minimized using low $NO_x$ combustion technology and postcombustion techniques. If combustion modifications alone are insufficient, postcombustion techniques such as selective noncatalytic reduction (SNCR) or selective catalytic reduction (SCR) systems may be employed. In SNCR or SCR systems, $NO_x$ is reduced to nitrogen ($N_2$) and water ($H_2O$) through a series of reactions with a chemical reagent injected into the flue gas. Ammonia and urea are most the commonly used chemical reagents with SNCR systems, while ammonia is most commonly used for SCR systems.

Fluidized bed combustion has distinct advantages for burning solid fuels and recovering energy to produce steam; indeed, the primary driving force for the development of fluidized bed combustors in the United States is reduced $SO_2$ and $NO_x$ emissions. Typically, this technology can be used to burn high sulfur coals and achieve low $SO_2$ emission levels without the need for additional back-end sulfur removal equipment. Fluidized bed boilers are designed so that the bed operating temperature is between 1500 and 1600° F., resulting in lower $NO_x$ emissions. These lower operating temperatures also permit combustion of lower grade fuels (which generally have high slagging and fouling characteristics) without experiencing many of the operational difficulties which normally occur when such fuels are burned.

In CFB reactors or combustors, reacting and non-reacting solids are entrained within a reactor enclosure by an upward gas flow which carries the solids to an exit at an upper portion of the reactor enclosure. There, the solids are typically collected by an impact type primary particle separator, and returned to a bottom portion of the reactor enclosure either directly or through one or more conduits. The impact type primary particle separator at the reactor enclosure exit typically collects from 90% to 97% of the circulating solids. If required by the process, an additional solids collector may be installed downstream of the impact type primary particle separator to collect additional solids for eventual return to the reactor enclosure.

CFB reactors or combustors are known (see, for example, U.S. Pat. No. 5,343,830 to Alexander et al.) wherein the two or more rows of impingement members located within the furnace or reactor enclosure are followed by a second array of staggered impingement members which further separate particles from the gas stream, and return them via cavity means and particle return means without external and internal recycle conduits.

Both SCR and SNCR systems have been applied to reduce $NO_x$ emissions from pulverized coal fired steam generating systems. SNCR systems have also been applied to fluidized bed steam generators, and it has been proposed to combine a CFB steam generator for petroleum coke firing with an SCR system.

SUMMARY OF THE INVENTION

The present invention relates generally to the field of circulating fluidized bed (CFB) reactors or combustors and provides a system to achieve low $NO_x$ emissions at lowest operating cost. Fluidized bed combustion technologies provide combustion temperatures that are much lower (1550–1600° F.) at the point of fuel admission than in pulverized coal combustion systems, where the combustion temperatures may be 2500–3000° F. This difference in combustion temperature contributes to a large difference in uncontrolled $NO_x$ emissions from the fluidized bed. Uncontrolled $NO_x$ emissions from pulverized coal technologies typically ranges from 0.3 to 0.7 lbs/$10^6$ Btu, but $NO_x$ emissions from fluidized bed technologies is several times less, typically 0.12–0.2 lbs/$10^6$ Btu. However, even more stringent emissions regulations are being encountered, typically on the order of 0.10 lbs/$10^6$ Btu. This degree of $NO_x$ reduction has been accomplished on fluid bed technologies with SNCR systems (spraying ammonia at locations where the gas temperatures are in the range of 1450–1650° F.), and on pulverized coal technologies with SCR systems (spraying ammonia at locations where the gas temperatures are in the range of 750° F.). However, experience with SCR technology has shown that less ammonia is needed for a given reduction in $NO_x$ and the unreacted ammonia leaving the system is less than with SNCR technology (usually, 5 ppm with SCR as compared with 25 ppm with SNCR). Since the initial $NO_x$ in fluidized bed systems is lower, the $NO_x$ after the SCR system can be much lower with only a minimal use of catalyst and ammonia.

Accordingly, one aspect of the present invention is drawn to a combination of a CFB reactor or combustor and an SCR system. The combination comprises a CFB reactor enclosure for conveying a flow of flue gas/solids therethrough, primary particle separator means for separating solids particles from the flow of flue gas/solids, and means for returning the solids particles collected by the primary particle separator means to the reactor enclosure. At least one of superheater and reheater heat transfer surface is located downstream of the primary particle separator means with respect to the flow of flue gas/solids. Multiclone dust collector means, located downstream of the at least one of superheater and reheater heat transfer surface, are provided for further separating solids particles from the flow of flue gas/solids, together with means for returning the solids particles collected by the multiclone dust collector means to the reactor enclosure. An SCR system is located downstream of the multiclone dust collector means for removing $NO_x$ from the flow of flue gas/solids, and dry scrubber means is located downstream of the SCR system. Finally, means are provided for injecting ammonia into the flow of flue gas/solids upstream of the SCR system to cause the chemical reactions which reduce the $NO_x$ emissions.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

As used herein, the term CFB combustor refers to a type of CFB reactor where a combustion process takes place. While the present invention is directed particularly to boilers or steam generators which employ CFB combustors as the means, by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a by-product of a combustion process.

To the extent necessary to describe the general operation of CFB reactors and combustors, the reader is referred to Chapter 16 of *Steam/its generation and use*, 40th Edition, Stultz and Kitto, Eds, Copyright© 1992, The Babcock Wilcox Company, and to U.S. Pat. No. 5,343,830 to Alexander et al., both of which are hereby incorporated by reference as though fully set forth herein. For background information concerning $NO_x$ reduction techniques and apparatus in general, and to selective catalytic reduction (SCR) systems in particular, the reader is also referred to the aforementioned *steam* text, at Chapter 34 thereof, the text of which is also hereby incorporated by reference as though fully set forth herein.

Figure 1:
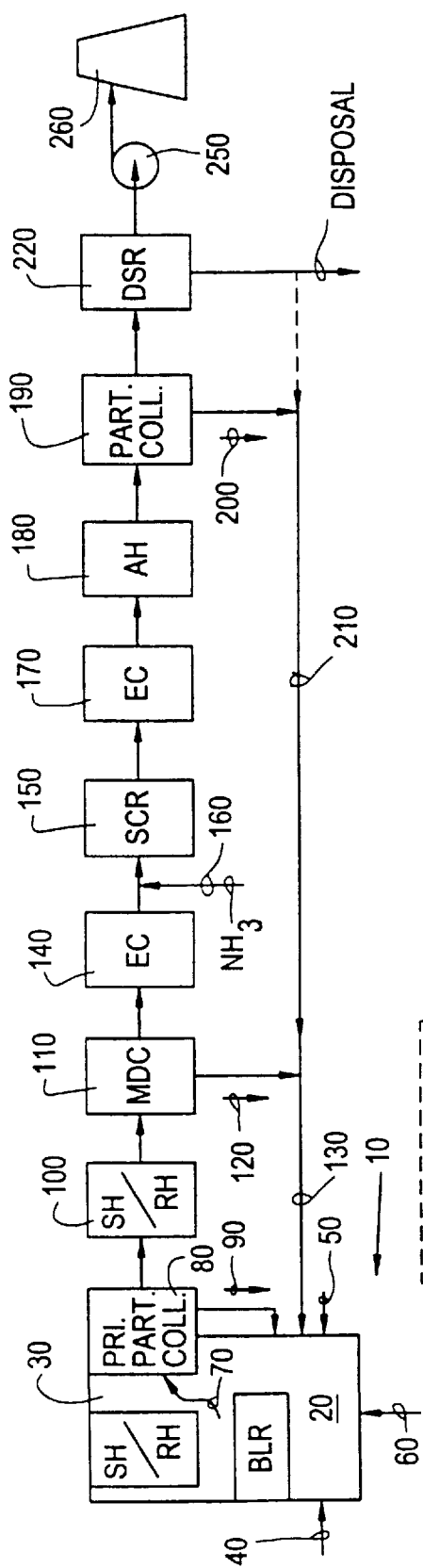
FIG. 1 is a schematic representation of the combination of a circulating fluidized bed (CFB) reactor or combustor and SCR system according to a first embodiment of the invention.
Figure 2:
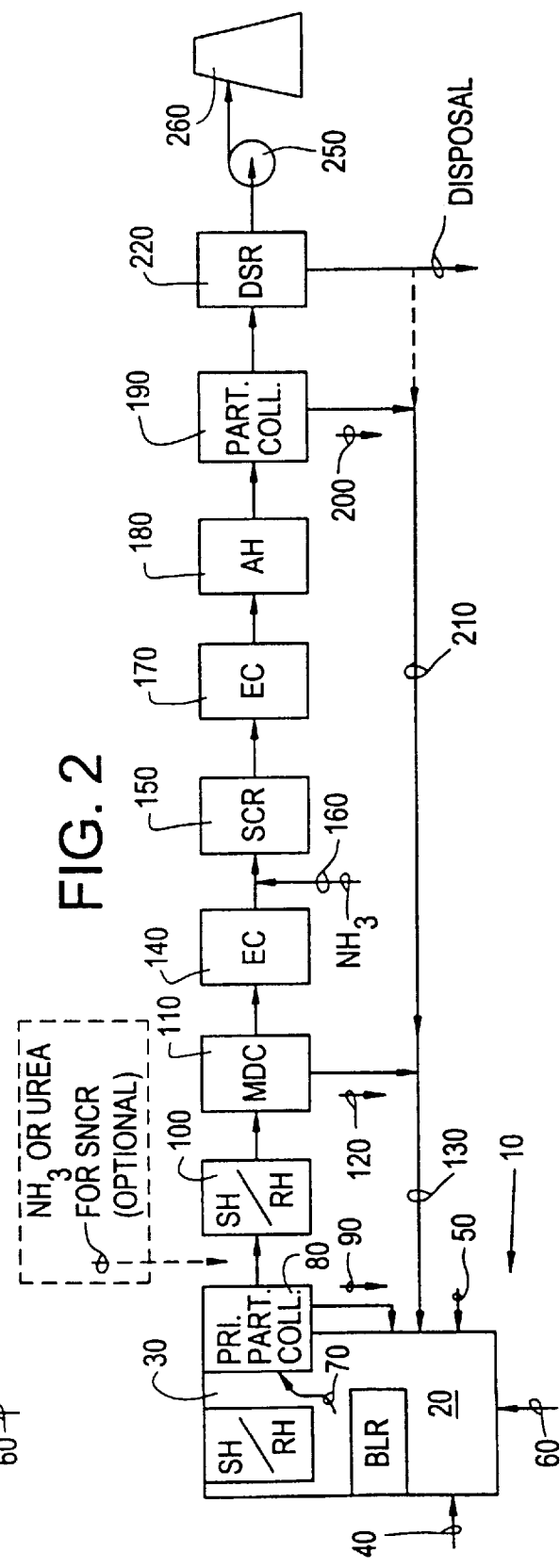
FIG. 2 is a schematic representation of the combination of a circulating fluidized bed (CFB) reactor or combustor and SCR system according to a second embodiment of the invention.
Figure 3:
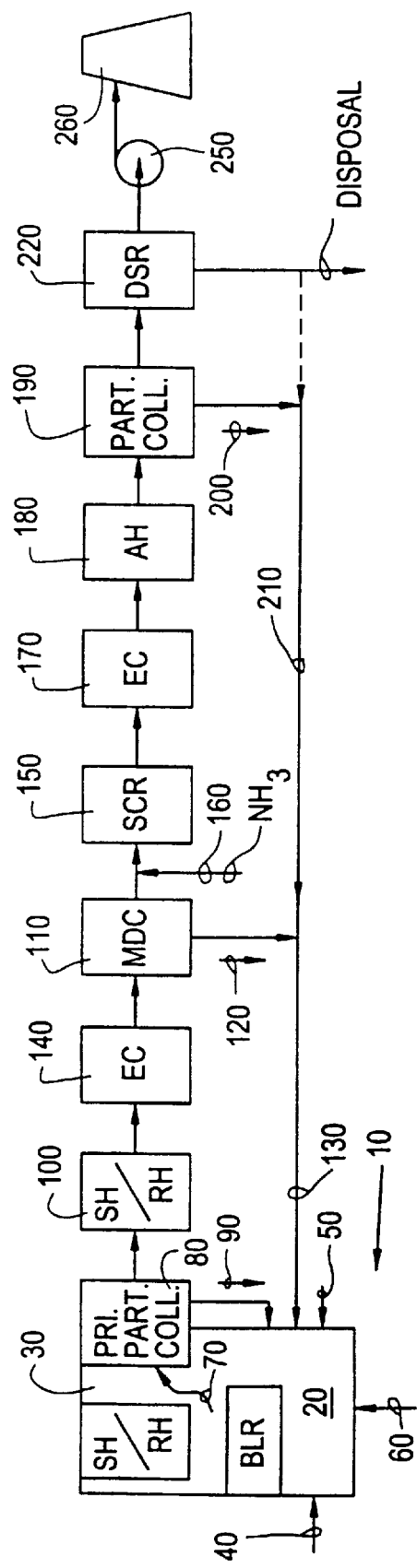
FIG. 3 is a schematic representation of the combination of a circulating fluidized bed (CFB) reactor or combustor and SCR system according to a third embodiment of the invention.

Referring generally to the drawings, wherein like reference numerals represent the same or functionally similar elements throughout the several drawings, and to FIGS. 1–3 in particular, there is shown a circulating fluidized bed (CFB) reactor or combustor, generally designated 10, comprising a reactor enclosure 20 having an upper portion 30. The reactor enclosure 20 is typically rectangular in cross-section and is defined by fluid cooled enclosure walls typically comprised of water and/or steam conveying tubes separated from one another by a steel membrane to achieve a gas-tight reactor enclosure 20.

Fuel 40 such as coal, sorbent 50 such as limestone, and combustion air 60 are provided into the reactor enclosure 20 using means well known to those skilled in the art. The combustion process occurring within a lower portion of the reactor enclosure 20 thus produces a flow of flue gas/solids 70 which is conveyed upwardly out of the reactor enclosure 20, passing across several solids particle and heat removal stages, as will be herein described, before being conveyed to the atmosphere.

Located in the upper portion 30 of the reactor enclosure 20, in the direction of the flue gas/solids flow 70, primary particle separator means 80 are provided to collect solids particles from the flow of flue gas/solids 70 so that they may be returned to a lower portion of the reactor enclosure 20. Preferably, the primary particle separator means 80 comprises an array of staggered, impact type particle separators (not shown). The staggered, impact type particle separators are non-planar; they may be U-shaped, E-shaped, W-shaped or any other shape which presents a cupped or concave surface configuration to the flow of incoming flue gas/solids 70. Alternatively, the primary particle separator means 80 may comprise a cyclone separator of known construction (not shown).

Solids particles 90 removed from the flow of flue gas/solids flow 70 are returned to the reactor enclosure 20, either via L-valves or via internal recirculation such as is described in U.S. Pat. No. 5,343,830 to Alexander et al., and thus this return is merely schematically indicated in the Figs.

The flow of flue gas/solids 70 is then conveyed to and across one or more banks of heat transfer surface comprising superheater (SH) and/or reheater (RH) surface 100, and then (in FIGS. 1 and 2) to a secondary stage of particle separation typically employing a multiclone dust collector (MDC) 110. Solids particles 120 removed by the MDC 110 are returned to the reactor enclosure 20 via line 130, and the flue gas/solids 70 is then conveyed to and across one or more banks of economizer (EC) heat transfer surface 140 before being conveyed to an SCR system 150.

Alternatively, as illustrated in FIG. 3, the placement of the MDC 110 and EC 140 may be reversed, such that the flue gas/solids 70 is conveyed from the SH/RH 100 to the EC 140 and then to the MDC 110. In any of the embodiments illustrated in FIGS. 1–3, and as well known to those skilled in the art, the particular amount of EC 140 employed would depend upon the desired flue gas temperature entering the SCR 150 for proper optimum operation. From there, the flow of flue gas/solids 70 would be conveyed to the SCR 150 as before. Means 160 for injecting ammonia into the flow of flue gas/solids 70 at a location upstream of the SCR 150 are also provided.

As illustrated in FIG. 2, it may be possible to combine the injection of urea or ammonia at a suitable location (with respect to temperature, etc.) in the flow of flue gas/solids flow 70 to achieve further $NO_x$ reduction.

Upon leaving the SCR 150, the flue gas/solids 70 is then typically conveyed to and across another bank of EC surface, this time designated 170 for clarity, and thence to air heater means 180 of known design. Air heater means 180 may be of the regenerative or recuperative type. Next, in the direction of flue gas/solids flow 70, a final particulate collection means 190 is provided, and which may comprise either a baghouse or electrostatic precipitator. Particles 200 collected by the particulate collection means 190 may also be returned to the reactor enclosure 20 via line 210. Downstream of the particulate collection means 190 may also be provided a dry scrubber reactor system, generally designated 220, for sulfur capture from the flue gas/solids 70. For a description of dry scrubber systems and their general principles of operation, the reader is referred to Chapter 35 of *Steam/its generation and use*, 40th Edition, Stultz and Kitto, Eds, Copyright© 1992, The Babcock Wilcox Company, the text of which is hereby incorporated by reference as though fully set forth herein. Finally, an induced draft fan 250 would receive the flue gas/solids 70 and convey it to a stack 260 in known fashion.

The present invention recognizes that CaO, produced in the bed of a CFB reactor or combustor, is potentially detrimental to the catalyst used in an SCR system 150. The range of gas/solids analyses that might be expected downstream of the MDC 110 is as follows:

| Gas Analysis, Vol. % | | Solids Analysis, Wt. % | |
|---|---|---|---|
| $CO_2$ | 14–15 | CaO | 4–14 |
| $H_2O$ | 7–15 | $CaSO_4$ | 8–16 |
| $O_2$ | 3–4 | C | 6–10 |
| $SO_2$ | 0.02–0.04 (200–400 ppm) | Ash* | balance |
| $N_2$ | balance | | |

(*major ash constituents are $SiO_2$, $Al_2O_3$, $Fe_2O_3$)

However, if sulfur reduction is performed using limestone feed, there should be less CaO content in the fuel ash as the Ca/S ratio for a given sulfur capture is lower in a CFB. Additionally, using a dry scrubber 220 for sulfur capture, as a sole means or along with sorbent feed into the reactor enclosure 20, may be further beneficial in reducing CaO content in any ash particles entering the SCR system 150, thereby enhancing $NO_x$ emissions.

While a specific embodiment of the invention has been shown and described in detail to illustrate the application of the principles of the invention, it will be understood that the invention may be embodied otherwise without departing from such principles. For example, the present invention may be applied to new construction involving CFB reactors or combustors, or to the repair, replacement, or modification of existing CFB reactors or combustors. In some embodiments of the invention, certain features of the invention may be used to advantage without a corresponding use of other features. Accordingly, all such changes and embodiments properly fall within the scope and equivalents of the following claims.

We claim:

1. In combination, a CFB reactor or combustor arrangement and an SCR system, comprising:
   a CFB reactor enclosure for conveying a flow of flue gas/solids therethrough, primary particle separator means for separating solids particles from the flow of flue gas/solids, and means for returning the solids particles collected by the primary particle separator means to the reactor enclosure;
   at least one of superheater and reheater heat transfer surface located downstream of the primary particle separator means with respect to the flow of flue gas/solids;
   multiclone dust collector means, located downstream of the at least one of superheater and reheater heat transfer surface, for further separating solids particles from the flow of flue gas/solids, and means for returning the solids particles collected by the multiclone dust collector means to the reactor enclosure;
   an SCR system located downstream of the multiclone dust collector means for removing $NO_x$ from the flow of flue gas/solids;
   dry scrubber means located downstream of the SCR system; and
   means for injecting ammonia into the flow of flue gas/solids upstream of the SCR system.

2. The combination according to claim 1, wherein the primary particle separator means comprises an array of staggered, impact particle separators having one of a U-shaped, E-shaped, and W-shaped configuration in cross-section.

3. The combination according to claim 1, further comprising economizer heat transfer surface located upstream of the SCR system to achieve a preselected flue gas temperature entering the SCR system.

4. The combination according to claim 1, further comprising economizer heat transfer surface and air heater means located downstream of the SCR system.

5. The combination according to claim 1, further comprising air heater means located downstream of the SCR system, and particle collector means located downstream of the air heater means.

6. The combination according to claim 5, comprising means for returning solids particles collected from the flow of flue gas/solids by the particle collector means and the dry scrubber means to the reactor enclosure.

7. The combination according to claim 5, wherein the particle collector means located downstream of the air heater means comprises one of a baghouse and electrostatic precipitator.

8. The combination according to claim 1, comprising separate means for injecting one of ammonia and urea in a preselected temperature range of approximately 1450–1650° F. upstream of the SCR system in the vicinity of the at least one of superheater and reheater heat transfer surface.

9. The combination according to claim 1, comprising at least one of superheater, reheater, and boiler heat transfer surface located within the reactor enclosure upstream of the primary particle separator means.

10. The combination according to claim 1, wherein the primary particle separator means comprises a cyclone separator.

11. The combination according to claim 1, comprising a baghouse, located downstream of the SCR system, for further separating solids particles from the flow of flue gas/solids, and means for returning the solids particles collected by the baghouse to the reactor enclosure.

* * * * *